(12) United States Patent
Kogiantis et al.

(10) Patent No.: US 6,751,480 B2
(45) Date of Patent: Jun. 15, 2004

(54) METHOD FOR SIMULTANEOUSLY CONVEYING INFORMATION TO MULTIPLE MOBILES WITH MULTIPLE ANTENNAS

(75) Inventors: Achilles George Kogiantis, Madison, NJ (US); Ashok N. Rudrapatna, Basking Ridge, NJ (US); Mehmet Oguz Sunay, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 409 days.

(21) Appl. No.: 09/727,896

(22) Filed: Dec. 1, 2000

(65) Prior Publication Data

US 2002/0068611 A1 Jun. 6, 2002

(51) Int. Cl.⁷ .............................................. H04B 1/00
(52) U.S. Cl. ................................. 455/562.1; 455/452.1
(58) Field of Search ................................ 455/561, 562, 455/33.3, 452.1, 450; 370/410, 522; 714/57, 47

(56) References Cited

U.S. PATENT DOCUMENTS

| | | | | | |
|---|---|---|---|---|---|
| 5,163,071 | A | * | 11/1992 | Gelin | 375/354 |
| 5,628,052 | A | * | 5/1997 | DeSantis et al. | 455/562.1 |
| 5,717,689 | A | * | 2/1998 | Ayanoglu | 370/349 |
| 5,937,333 | A | * | 8/1999 | Sexton et al. | 455/73 |
| 6,021,124 | A | * | 2/2000 | Haartsen | 370/336 |
| 6,069,885 | A | * | 5/2000 | Fong et al. | 370/336 |
| 6,097,969 | A | * | 8/2000 | Angus et al. | 455/562.1 |
| 6,119,263 | A | * | 9/2000 | Mowbray et al. | 714/781 |
| 6,205,130 | B1 | * | 3/2001 | DeJaco | 370/335 |
| 6,347,235 | B1 | * | 2/2002 | Angus et al. | 455/562.1 |
| 6,426,814 | B1 | * | 7/2002 | Berger et al. | 398/45 |
| 6,473,399 | B1 | * | 10/2002 | Johansson et al. | 370/229 |
| 2002/0064167 | A1 | * | 5/2002 | Khan et al. | 370/410 |

FOREIGN PATENT DOCUMENTS

| | | | | |
|---|---|---|---|---|
| EP | 0 702 462 A1 | 3/1996 | | H04B/7/08 |
| EP | 0 735 701 A2 | 10/1996 | | H04B/7/08 |
| EP | 0 987 842 A1 | 3/2000 | | H04B/7/26 |
| GB | 2 323 75 0 A | 9/1998 | | H04B/7/04 |

OTHER PUBLICATIONS

Sayeed, Z., "Throughput Analysis and Design of Fixed and Adaptive ARQ/Diversity Systems For Slow Fading Channels", IEEE Globecom 1998, vol. 6, pp. 3686–3691.
European Search Report.

* cited by examiner

Primary Examiner—Nay Maung
Assistant Examiner—Tan Trinh

(57) ABSTRACT

A method for increasing the capacity of a communication network by assigning subscribers of the communication network to individual antennas of an antenna array and allowing the antenna array to convey information to the assigned subscribers under the control of a scheduling algorithm. Antennas—under the control of the scheduling algorithm—in the antenna array are thus able to convey information to different subscribers at different times. The scheduling algorithm determines when to convey information to an assigned subscriber based on channel condition information it receives from the subscribers. The scheduling algorithm also uses the channel condition information to assign certain subscribers to certain antennas.

7 Claims, 1 Drawing Sheet

METHOD FOR SIMULTANEOUSLY CONVEYING INFORMATION TO MULTIPLE MOBILES WITH MULTIPLE ANTENNAS

BACKGROUND OF THE INVENTION

1. Field of the Invention

The present invention generally relates to a method for transmitting information to a plurality of mobiles from an antenna array.

2. Description of the Related Art

In communication networks and, in particular, in wireless communication networks there is a need to increase the overall capacity of the network. The overall capacity of a network relates the number of subscribers that can be served by the network and the amount of information each such subscriber can convey (i.e., transmit and/or receive) at any particular time. Service providers, who are entities that own, operate and control system equipment used in a communication network, are constantly challenged by their subscribers to provide more communication channels and to increase the amount of information each such channel can transmit and/or receive at any particular instant of time.

The service providers are therefore constantly searching for methods and equipment that can meet the changing needs of their subscribers. Subscribers of communication networks, including wireless communication networks, require higher information throughput in order to exploit the expanding range of services being provided by current communication networks. For example, wireless communication subscribers are now able to have simultaneous access to data networks such as the Internet and to telephony networks such as the Public Switched Telephone Network (PSTN). Service providers are constantly investigating new techniques that would allow them to increase their information throughput. Information throughput is the amount of information—usually measured in bits per second—successfully conveyed over a communication channel. Information throughput can be increased in a number of well known manners. One way is by increasing the power of the transmitted signals. A second way is by expanding the frequency range (i.e., bandwidth) over which the communication is established. However, both power and bandwidth are typically limited by governmental and standards organizations that regulate such factors. In addition, for portable devices, power is limited by battery life.

An approach which circumvents the power and bandwidth limitations is to increase the number of antennas used to transmit and receive communication signals. Typically, the antennas are arranged as an array of antennas. One techniques used by service providers is commonly referred to as a MIMO (Multiple Input Multiple Output) technique. In a MIMO configuration, the antenna array is coupled to a signal processing device and the combination is used to transmit and/or receive multiple distinct signals. One example of a MIMO system is the BLAST (Bell Labs Layered Space Time) system conceived by Lucent Technologies headquartered in Murray Hill, N.J. In a MIMO configuration such as BLAST, all of the antennas of the array are used to either transmit or receive information to or from a subscriber at a particular instant of time. Typically, the subscriber equipment or mobile (e.g., cellular phone, wireless laptop, Personal Digital Assistant (PDA)) is also equipped with an antenna array that is used to transmit or receive information from system equipment (e.g., cell site or base station).

Although a MIMO configuration is helpful in increasing the information throughput of a particular communication channel, it does not necessarily help increase the number of subscribers that can adequately use the communication network. For example, the antenna array at a base station implementing the MIMO technique would cause all or a plurality of antennas of the antenna array to simultaneously transmit (or receive) information to a cellular phone being used by a subscriber. Thus, the array is used by only one subscriber at any particular time and does not serve to increase the number of subscribers that can use the system at any one time. Also, certain antennas in the antenna array at the base station may not be the most appropriate antenna for conveying information to certain subscribers at certain times. It is well known that channel conditions vary from one instant of time to another and many times such conditions adversely affect communications between a subscriber and a base station. Therefore, even though a plurality of antennas is being used to convey information, some of these antennas may not be conveying information successfully thereby reducing the efficiency of the antenna array. The efficiency of the antenna array is the ratio of the amount of information that is actually conveyed to the amount of information that the antenna array is designed to convey.

What is therefore needed is a method that uses antenna arrays of a communication network in such a manner so as to increase the number of subscribers using the communication network. What is also needed is a method of employing an antenna array to convey information to a plurality of subscribers in an efficient manner.

SUMMARY OF THE INVENTION

The present invention is a method for conveying information in a communication network using an antenna array where certain of the antennas in the array are coupled to a scheduler such that the number of communication channels used by the network is increased and the antenna is used in an efficient manner. In particular, the method provides an antenna array where certain of the antennas are under the control of a scheduling algorithm residing in the scheduler and each of these antennas is assigned to one or a group subscribers of the communication network. The scheduling algorithm determines when to convey information over a communication channel to a particular corresponding subscriber and accordingly causes the appropriate antenna to convey information to the subscriber for a determined period of time. The scheduling algorithm determines when an antenna is to convey information to a particular subscriber based on channel condition information received by the scheduling algorithm from the subscriber equipment.

The scheduling algorithm allows each antenna under its control to operate in two modes. In the first mode of operation, one or a group of subscribers is pre-assigned to the antennas that are under the control of the scheduling algorithm. The scheduling algorithm then determines when an antenna is allowed to convey information to a pre-assigned subscriber. The scheduling algorithm thus allows the antenna to convey information for any one of the pre-assigned subscribers over its respective communication channel based on channel condition information it receives from its pre-assigned subscribers.

In the second mode of operation, the subscribers of the communication network are not assigned to any particular antenna under the control of the scheduling algorithm. When information associated with a particular subscriber is to be conveyed to that subscriber, the scheduling algorithm selects the most appropriate antenna to convey the information. The scheduling algorithm determines the most appropriate antenna from channel condition information it receives for that particular antenna and the other antennas under its control. In particular, the scheduling algorithm monitors the various channel condition information received from the subscribers and selects the most appropriate antenna for conveying information to a particular subscriber at a particular instant of time. Thus, in this mode of operation, a subscriber is not limited to conveying its information to any particular antenna. Conversely, an antenna under the control of the scheduling algorithm is not limited to convey information to a particular subscriber or group of subscribers.

DETAILED DESCRIPTION

Figure 1:
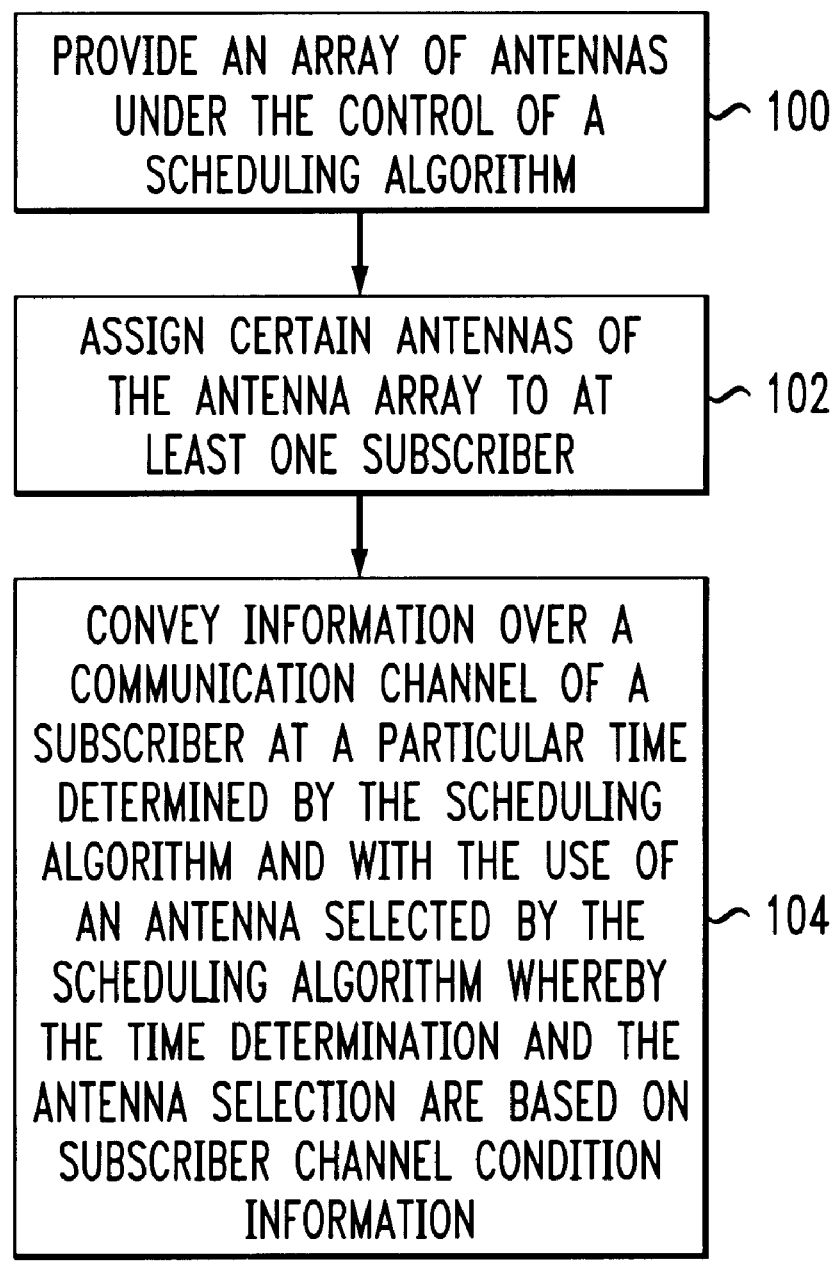
FIG. 1 is a flowchart depicting the steps of the method of the present invention.

The present invention is a method for conveying information in a communication network using an antenna array where certain antennas in the antenna array are under the control of a scheduling algorithm such that the number of communication channels used by the network is increased and the antenna is used in an efficient manner. Each antenna in the antenna array comprises a plurality of communication channels through which information is conveyed between subscriber equipment and system equipment. The antenna array comprises N individual antennas where N is an integer equal to 2 or greater. The array comprises any physical grouping of antennas configured such that the grouping is under the control of the scheduling algorithm within the scheduler. For example, the array can be a group of antennas distantly located from each other or proximately located from each other. The antenna array can also be a group of closely packed antenna elements constituting an antenna array device.

In particular, the method provides a set of antennas under the control of a scheduling algorithm whereby certain of the antennas from the set are assigned to one or a group of subscribers of the communication network. The number of antennas in the set can vary from 2 to N inclusive. The scheduling algorithm resides in a scheduler where such scheduler is any well known equipment (e.g., computer, microprocessor based circuit) that is controllable by a set of instructions representing the scheduling algorithm. The scheduling algorithm determines when to convey information over a communication channel to a particular corresponding subscriber and accordingly causes the appropriate antenna to convey information to the subscriber for a determined period of time. The scheduling algorithm determines when an antenna is to convey information to a particular subscriber based on channel condition information received by the scheduling algorithm from subscribers of the communication network. The scheduling algorithm selects the antenna used to convey the information, and such selection is also based on channel condition information received from subscribers of the communication network. In short, each of the antennas under the control of the scheduling algorithm conveys information for different or same subscribers at different times thereby increasing the capacity of the communication network and improving the efficiency of the antennas. At a particular instant of time, some or all of the antennas from the set are simultaneously conveying information to subscribers.

For ease of explanation, the method of the present invention is explained in the context of the forward link of a wireless Code Division Multiple Access (CDMA) communication network. It should be noted, however, that the method of the present invention is also applicable to the reverse link and more generally is applicable to any link of other types of wireless communication networks (e.g., TDMA, FDMA) and wireline communication networks. The forward link comprises the communication channels used to transmit information from system equipment (e.g., base station) to subscriber equipment (e.g., cell phone) of the communication network. Conversely, information is transmitted from subscriber equipment to system equipment over communication channels that constitute a reverse link. The information comprises all types of information including but not limited to voice, video, text data, and graphics data. It will readily obvious to one skilled in the art to which this invention belongs that the method of the present invention can be implemented at a subscriber terminal (e.g., cell phone). In such a case, the scheduling algorithm controls an array of antennas whereby both the algorithm and the array reside within the subscriber equipment.

Referring now to FIG. 1, in step 100, the method of the present invention provides an array of antennas whereby each such antenna is under the control of a scheduling algorithm. The scheduling algorithm is any algorithm used to determine time of transmission of distinct information associated with distinct subscribers of a communication network. One particular scheduling algorithm operates in the context of an Asynchronous and Adaptive Incremental Redundancy (AAIR) scheme whereby an original block of information is coded into a packet of information that is then divided into a number of sub-packets of coded information. Each sub-packet is configured such that when properly decoded the entire original block of information can be obtained. In particular, after a subscriber receives a first sub-packet and decodes this first sub-packet, the subscriber transmits either an ACKnowledge (ACK) message confirming that the sub-packet was properly decoded or a Negative ACKnowledge (NACK) message indicating that the first sub-packet could not be properly decoded and that a second sub-packet should be transmitted. The second sub-packet is then transmitted. The AAIR scheme will then allow the receiving subscriber equipment to now decode the combination of the first second sub-packets to obtain the original block of information. In essence, the AAIR scheme allows receiving equipment to decode one or any number of the sub-packets to obtain the original block of information. The scheduling algorithm used in the method of the present invention can therefore operate in the context of the AAIR scheme wherein the sub-packets of coded information (instead of a block of original information) are conveyed to certain subscribers at a certain time. The AAIR scheme is disclosed in an application titled "Sub-Packet Adaptation In A Wireless Communication System" filed on Nov. 29, 2000 with Ser. No. 09/725,393 which is hereby incorporated by reference.

The scheduling algorithm can also operate in the context of an Automatic Retransmission request (ARQ) based retransmission protocol whereby packets of information that are received and cannot be properly decoded by subscriber equipment are retransmitted by the scheduling algorithm. Thus, the scheduling algorithm can schedule, blocks of information, ARQ packets, ARQ retransmitted packets, AAIR sub-packets or any other type of packets configured in the context of other schemes or protocols.

The control of an antenna by the scheduling algorithm refers to the scheduling algorithm being able to select certain antennas at certain instants of time and to cause such selected antennas to convey information to certain subscribers of the communication network. The antenna array is part of base station equipment and a set of antennas from the array operates under the control of the scheduling algorithm. In a preferred embodiment of the method of the present invention, all of the antennas of the array are under the control of the scheduling algorithm. The base station equipment is configured to receive channel condition information.

The received channel condition information is transferred to the scheduling algorithm. The scheduling algorithm processes the channel condition information. The channel condition information represents data that reflect quality of communication channels through which information is conveyed to the subscribers. One example of channel condition information is the Carrier to Interference ratio (C/I) which is an indication of the amount of information per unit time (i.e., information rate) that a communication channel can handle. In general, the higher the C/I ratio, the better the quality of a communication channel. Another example of channel condition information that reflects the quality of a communication channel is the power level of a carrier measured at a subscriber equipment. In CDMA networks and other networks, the information is transmitted with the use of a carrier signal or a pilot signal having a certain power level at the base station. Each antenna of the antenna array has its own pilot signal defined by the frequency of such a signal. At a receiving subscriber equipment, the power level of the transmitted pilot is measured by the subscriber equipment and such channel metric based on the measurement is transmitted over the reverse link to the base station.

In step 102, each antenna under the control of the scheduling algorithm is assigned to at least one subscriber. The method of assignment of an antenna to at least one subscriber or to a group of subscribers depends on which mode of operation under which the method of the present invention is operating. In the first mode of operation, one or a group of subscribers are pre-assigned to a certain antenna that is under the control of the scheduling algorithm. The system equipment assigns each antenna under the control of the scheduling algorithm to one or a group of subscribers in any appropriate manner. Accordingly, the subscribers pre-assigned to a certain antenna can convey information only to that particular antenna. For a CDMA network, the pre-assigned subscribers are able to identify the pilot signal of the antenna to which they are pre-assigned and thus receive and process information only from that antenna.

In the second mode of operation, none of the antennas under the control of the scheduling algorithm is pre-assigned to any particular subscriber. The scheduling algorithm assigns a certain antenna to a particular subscriber by selecting the most appropriate antenna for the subscriber. The most appropriate antenna is selected based on channel condition information of that antenna. For CDMA networks and other communication networks, channel condition information is transmitted by the subscribers of the network to a base station over the reverse link. The channel condition information is transferred to the scheduling algorithm. The channel condition information indicate the quality of the communication channels of the antennas under the control of the scheduling algorithm. It should be noted that in the second mode of operation, all of the subscriber equipment are transmitting channel condition information to all of the antennas that are under the control of the scheduling algorithm; this is to allow the scheduling algorithm to get a profile of the quality of the communication channels of all the antennas that are under the control of the scheduling algorithm. The scheduling algorithm processes this information to allow it to select the most appropriate antenna for conveying information to a particular subscriber.

Based on the channel condition information received by the scheduling algorithm, a particular antenna determined by the scheduling algorithm to have the least adverse affect on the information to be transmitted is selected as the most appropriate antenna. Adverse effects are anomalies that occur in a communication channel that cause the information error rate of the communication channel to increase to an unacceptable level or cause the communication channel to transmit at a relatively lower information rate to avoid an unacceptably high information error rate.

In step 104, the scheduling algorithm causes information to be conveyed over a communication channel to a subscriber with the use of an antenna assigned to that particular subscriber. The scheduling algorithm determines when the information is to be conveyed based on channel condition information it receives from the subscribers. In the first mode of operation, the scheduling algorithm causes each antenna under its control to convey information to a subscriber among subscribers pre-assigned to that antenna. The scheduling algorithm determines the time of conveyance for each of the pre-assigned subscribers based on subscriber traffic conditions and associated priorities. At certain times during the day, the subscriber traffic may become relatively high. Certain types of subscriber information (such as voice or video) may have higher priorities than others in that such information have to be transmitted in accordance with strict timing requirements. Therefore, the time of conveyance of these subscriber information are typically given higher priorities than other types of subscriber information. The time of conveyance is also based on channel condition information received by the scheduling algorithm. Consequently, for a particular antenna under the control of the scheduling algorithm, different information destined for different subscribers are conveyed at certain times. The antenna however conveys information only to its assigned subscribers.

In the second mode of operation, the scheduling algorithm causes information to be conveyed over a communication channel of the selected antenna. The scheduling algorithm processes channel condition information it receives from all subscribers. For the second mode of operation, there are two algorithms associated with channel conditions returned by subscriber equipment. In the first approach, subscribers being served return channel condition information for a particular antenna (or a subset of antennas) that would provide the best performance. Therefore, some or all of the antennas in the set of antennas will have their channel condition information provided to the scheduling algorithm by one or a group of subscribers. In the second approach, each subscriber unit returns channel condition information associated with each transmitting antenna to the base station. For the first approach, for each antenna the scheduling algorithm chooses the best subscriber unit (among the subscriber units that have chosen that antenna) to serve for the current unit of time. For the second approach, for each antenna the scheduling algorithm chooses the best subscriber unit (from all the subscriber units) to serve for current unit of time. The criteria for choosing the best antenna or subscriber unit could be based on channel conditions that yield the best performance (e.g., C/I ratio, information error rate) individual user traffic quantities and their associated priorities.

Unlike the first mode of operation, any particular antenna under the control of the scheduling algorithm is thus able to convey information for any subscriber for which that antenna was selected. Thus, at one instant of time, the antenna is selected for one particular subscriber and at another instant, the antenna is selected for another subscriber.

We claim:

1. A method for conveying information in a communication network, the method comprising the steps of:

providing an array of N antennas whereby certain of the antennas are under the control of a scheduling algorithm where N is an integer equal to 2 or greater; and selecting one of the certain antennas based on channel condition information where, in a first mode of operation, the selected antenna is under the control of the scheduling algorithm and has been pre-assigned to one or a group of subscribers and in a second mode of operation, the selected antenna is an antenna under the control of the scheduling algorithm, and in either mode information is conveyed over a communication channel of the selected antenna.

2. The method of claim 1 wherein the step of providing N antennas comprises providing all N antennas under the control of the scheduling algorithm.

3. The method of claim 1 wherein the step of selecting one of the certain antennas comprises the steps of:

receiving channel condition information from subscribers of the communication network; and processing the received channel condition information to determine which antenna is the most appropriate antenna for a particular subscriber.

4. The method of claim 1 wherein the step of selecting one of the certain antennas further comprises the step of:

receiving channel condition information from subscribers of the communication network; and determining when to convey information for a particular subscriber based on the received channel condition information.

5. The method of claim 4 where the step of determining when to convey information for a particular subscriber is further based on subscriber traffic conditions and associated priorities.

6. The method of claim 1 wherein the scheduling algorithm operates in the context of an AAIR scheme where sub-packets of coded information are conveyed to subscribers with the use of an assigned antenna.

7. The method of claim 1 wherein the scheduling algorithm operates in the context of an ARQ based retransmission protocol.

* * * * *